United States Patent [19]
Avelange et al.

[11] Patent Number: 5,210,811
[45] Date of Patent: May 11, 1993

[54] METHOD FOR THE ALIGNMENT OF THE OPTICAL AXES OF AN OPTICAL FIBER AND OF AN OPTOELECTRONIC COMPONENT, AND DEVICE OBTAINED BY THIS METHOD

[75] Inventors: Gérome Avelange, Barbizon; Alain Tournereau, Chalette, both of France

[73] Assignee: Thomson Hybrides, Puteaux, France

[21] Appl. No.: 779,260

[22] Filed: Oct. 18, 1991

[30] Foreign Application Priority Data

Oct. 19, 1990 [FR] France ................... 90 12957

[51] Int. Cl.⁵ ............................................. G02B 6/42
[52] U.S. Cl. .................................... 385/91; 385/88
[58] Field of Search ............ 385/91, 88, 89, 90, 385/92, 93, 94, 62, 63, 81

[56] References Cited

U.S. PATENT DOCUMENTS

| | | | |
|---|---|---|---|
| 4,548,466 | 10/1985 | Evans et al. | 385/94 X |
| 4,768,199 | 8/1988 | Heinen et al. | 385/91 X |
| 4,798,439 | 1/1989 | Preston | 385/91 |

FOREIGN PATENT DOCUMENTS

| | | | |
|---|---|---|---|
| 0201208 | 9/1986 | Japan | 385/91 |
| 1-225909 | 9/1989 | Japan . | |
| 1-296204 | 11/1989 | Japan . | |

*Primary Examiner*—John D. Lee
*Assistant Examiner*—Phan T. Heartney
*Attorney, Agent, or Firm*—Oblon, Spivak, McClelland, Maier & Neustadt

[57] ABSTRACT

A method for the alignment of an optical fiber on the optical axis of a light-emitting or light-receiving semiconductor component uses only line contacts between the metal parts. With the component being fixed to a base provided with two grooves, and the fiber being provided with a sleeve, the position of the fiber is determined in polar coordinates by at least two plates which lie in grooves and form angles that are adjustable. The positions are fixed by laser soldering when the alignment is obtained. The device can be applied to optical heads.

5 Claims, 1 Drawing Sheet

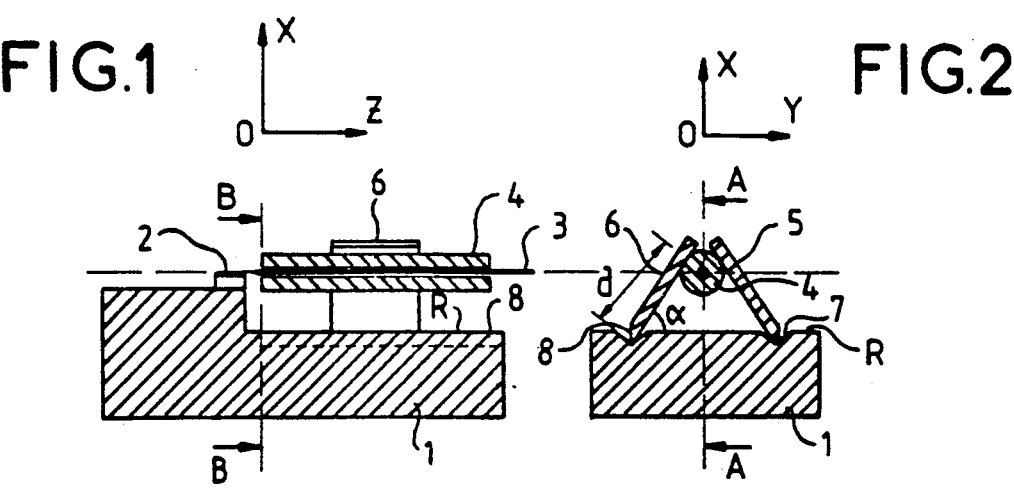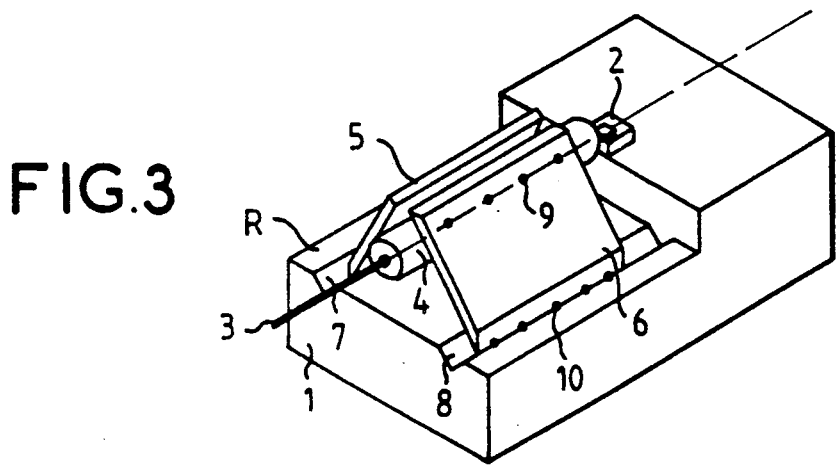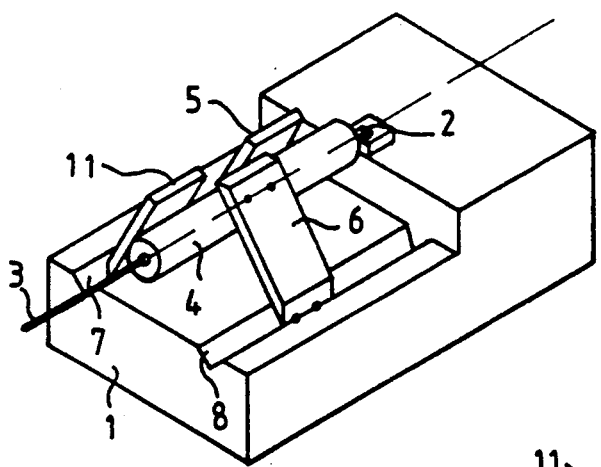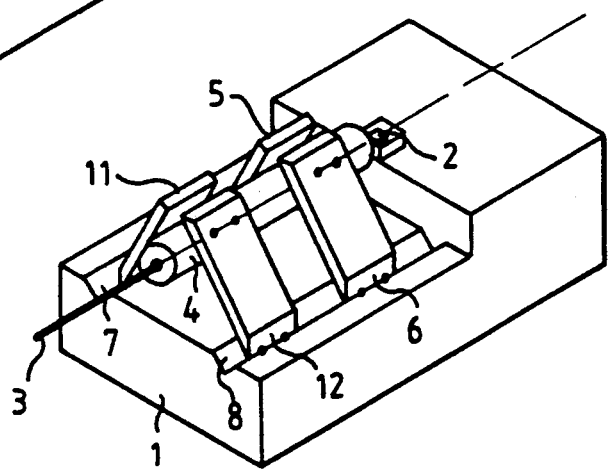

A
METHOD FOR THE ALIGNMENT OF THE OPTICAL AXES OF AN OPTICAL FIBER AND OF AN OPTOELECTRONIC COMPONENT, AND DEVICE OBTAINED BY THIS METHOD

BACKGROUND OF THE INVENTION

1. Field of the Invention

The present invention relates to a device and a method of optical alignment between an optical fiber and an optoelectronic semiconductor device, of the laser type for example. The device and the method are original in that they use polar coordinates rather than Cartesian coordinates to position the fiber.

2. Description of the Prior Art

It is known that, owing to the very small size of light-emitting or light-receiving optoelectronic components such as lasers, photodiodes and electroluminescent diodes, the adjusting of the alignment of the optical diodes is a delicate task since, in certain cases, it calls for precision of the order of one micrometer or even greater precision. This is why this adjusting of the alignment is very generally done dynamically and the optical fiber, which is shifted with a micromanipulator, is adjusted positionally while the optoelectronic device is in operation.

This adjusting is done along three orthogonal axes in space which, for convenience's sake, shall be called the axes Ox and Oy in a plane perpendicular to the optical axis, and the axis Oz in a plane parallel to the optical axis: the adjusting is therefore done in a system of Cartesian coordinates.

From the practical point of view, there are essentially two ways of aligning an optical fiber and an optoelectronic device. The first way is to shift the fiber inside a drop of glue or molten solder, placed in the vicinity of the light-emitting or light-receiving surface. When the optimum coupling is achieved, the drop of glue is polymerized by a flash of ultraviolet light, or the drop of solder is congealed by cooling. The method is simple and economical, but has the drawback wherein the contraction that occurs upon the hardening of the drop shifts or breaks the fiber.

The second method is based on the shifting of the fiber in two orthogonal planes, one of which is perpendicular to the optical axis while the other is parallel to the same axis. This means that the planes have to be perfectly machined so that the positioning of the fiber is precise and reliable. Furthermore, it is not always easy to fix one plane part to another plane part, except by their common edges.

SUMMARY OF THE INVENTION

The method according to the invention, and the optoelectronic device obtained by this method, no longer use a system of Cartesian coordinates as in the prior art. Rather, they use a system of polar coordinates which has the advantage of simplifying the mechanical parts that are in contact. The surface contacts of the systems of Cartesian coordinates are replaced by line contacts in polar coordinates.

In brief, the optical fiber is fixed into a metal sleeve. This subsequently enables it to be soldered into position. This sleeve is positioned by means of at least two metal plates. One end of each plate rests in a groove hollowed out of the block that is used as the base of the laser or optoelectronic device. The other end of each of the plates rests against the metal sleeve of the fiber. When the optical fiber is positioned, by micromanipulation and during the operation of the device, the positions of the metal parts are fixed by laser firing operations which weld them together.

More precisely, the invention relates to a method for the alignment of the optical axes of an optical fiber and of an optoelectronic semiconductor component, fixed to a base, an upper face of which serves as a reference plane, a method wherein the fiber is aligned facing the component according to a system of polar coordinates, by means of at least two plates located on either side of the fiber which take support on the reference face of the base, the angles of the plates with this face determining the position of the fiber.

BRIEF DESCRIPTION OF THE DRAWING

The invention shall be better understood through the more detailed description of an exemplary application, and of two variants, illustrated by the appended figures, of which:

FIGS. 1 and 2 show sectional views, in two orthogonal planes, of a device according to the invention;

FIG. 3, 4 and 5 shows views in space of a device according to the invention, in three alternative embodiments, to align the optical fiber on the axis of the optoelectronic component.

DETAILED DESCRIPTION OF THE INVENTION

In order to simplify the explanations and figures, the invention shall be explained with reference to the example of a laser, but it is clear to those skilled in the art that this in no way restricts the scope of the invention. If the optoelectronic semiconductor device is an electroluminescent diode or a phototransistor for example, only the shape of the base support changes: in this case, the handling of the fiber will be simpler, for it is lasers that require the greatest precision in alignment.

FIGS. 1 and 2 are deliberately aligned at the level of the optical axis common to the laser and the fiber. FIG. 1 shows a sectional elevation along the plane of symmetry A—A of the device, and FIG. 2 shows a sectional elevation along B—B of the end of the fiber facing the laser.

This part of an optical head, which is actually more complicated and includes a package and other electronic components, has at least one metal base 1 with a shape and dimensions that are adapted to each instance but have the permanent character of serving as a base and reference plane R for the laser 2 and optical fiber 3. This optical fiber 3 is itself passed through and fixed into a cylindrical metal sleeve 4, according to a well-known technique that enables the fiber to be grasped, in order to be micromanipulated, without being broken.

The means used to fix the fiber 3 in a position that is aligned on the emitting strip of the laser 2 comprise at least two metal plates 5 and 6. Each one has a side, preferably bevelled, that rests in a groove 7 and 8 respectively, hollowed out in the base 1, parallel to the optical axis. The grooves 7 and 8 are sufficiently distant from one another to make it possible for the plates 5 and 6, under the effect of the forces of gravity, to rest against the metal sleeve 4. Since the grooves 7 and 8 are parallel to the optical axis, it follows that the plates 5 and 6 are in contact with the generatrix of the cylindrical sleeve 4: it is therefore a line contact, which is easier to make than a contact between planes as is done in the prior art.

As described up till now, the parts forming the system are only laid: they are not fixed. They will be fixed after the adjusting of the alignment between the optical axis of the laser 2 and the optical axis of the fiber 3.

FIG. 2 shows that each of the plates 5 and 6 can pivot about the groove 7 and 8 and can therefore have its own angle, in a system of polar coordinates. The combination of the angles of the two plates 5 and 6 enables the fiber 3 to be centered along the axis Oy.

However, simultaneously, the micromanipulator (which is not shown) may raise or lower the sleeve 4 so as to align the fiber 3 on the laser 2 along the axis Ox. In doing so, if this sleeve 4 varies in position, it shifts the plates 5 and 6: hence, finally, it is in a system of polar coordinates that the question of the position of the optical fiber is resolved, this position being defined by the angle $\alpha$, between one of the plates 5 or 6 and the upper plane of the base 1, and by the distance "d" between the groove and the point at which the sleeve 4 is tangential to said plate 5 or 6.

For batch manufacturing in which all the sleeves are manufactured with high precision and regularity, the position of the fiber may also be defined by the two angles of the two plates 5 and 6.

The adjusting of the distance between the laser 2 and the end of the fiber 3, along the axis Oz, may be done either before or after the alignment along the axes XOy.

After positioning and dynamic adjusting, with the laser being in operation and the sleeve 4 being shifted with a micromanipulator, the last step of the method consists in fixedly joining the base, the plates and the sleeve together by means of some spots of solder by a power laser. FIG. 3 clearly show the solder spots 9 which fix the plates 5 and 6 to two generatrices of the cylindrical sleeve 4, and the solder spots 10 which fix the same plates to the base 1.

The simplest case is clearly that in which only two plates 5 and 6 hold and orient the fiber 3 in its sleeve 4. External stresses of different types may dictate a more rigid immobilization of the fiber 3 by means of three or four plates 11, 12, as shown in FIGS. 4 and 5. In this case, the two plates 4 and 5 which are closest to the laser 2 are fixed first and if an external stress tends to deform the system and misalign the fiber 3, this stress may be cancelled by the effect of the plates 11 and/or 12 which are furthest away from the laser 2.

The metal parts of the system are made of a material that bends little under temperature, for example a Fe-Ni-Co alloy such as Invar, Kovar or Dilver.

It is clear to those skilled in the art that the parts, as described, may be adapted to a type of semiconductor other than a laser, and that the shape of the plates does not restrict the scope of the invention.

What is claimed is:

1. A method for the alignment of an optical axis of an optical fiber held in a sleeve with an optoelectronic semiconductor component, fixed to a base, said base having an upper face serving as a reference plane, comprising the steps of:

aligning said optical fiber facing said component according to a system of polar coordinates, by means of at least two plates with each plate located on and contacting a respective part of said sleeve holding said fiber, said contacting occurring along a series of parallel first lines and each of said plates being supported on said upper face of said base along a series of co-planar second lines parallel to said first line;

determining the position of said fiber based upon angles made by each of said plates with said reference plane;

securing each of said plates to said sleeve along respective ones of said first lines and to said face along respective ones of said second lines.

2. A method of alignment according to claim 1, wherein the end of the fiber is provided with a metal sleeve, wherein the plates are also metallic and wherein, when the alignment is obtained, the plates are laser soldered to the sleeve and to the base by means of solder spots.

3. A method of alignment according to claim 1, wherein the plates each lie by one edge in a groove hollowed out in the base, parallel to the optical axis.

4. An optoelectronic device, comprising:

an optical fiber aligned on an optical axis of an optoelectronic semiconductor component, said optical fiber being provided with a metal sleeve;

at least two metal plates for positioning said optical fiber provided in said metal sleeve wherein said metal plates rest firstly in grooves along a respective first and second line with said grooves being hollowed out in a base of said device and, secondly, said metal plates rest against said sleeve of said fiber along a respective third and fourth coplanar lines with said base, said plates and said sleeve being fixedly joined by laser soldering along said first, second, third and fourth lines which are all parallel.

5. A device according to claim 4, wherein the grooves are parallel to the optical axis of the device, and wherein the plates are located on either side of the sleeve.

* * * * *